March 13, 1973     D. J. RUSIN     3,720,477
DEBURRING TOOL
Filed July 12, 1971
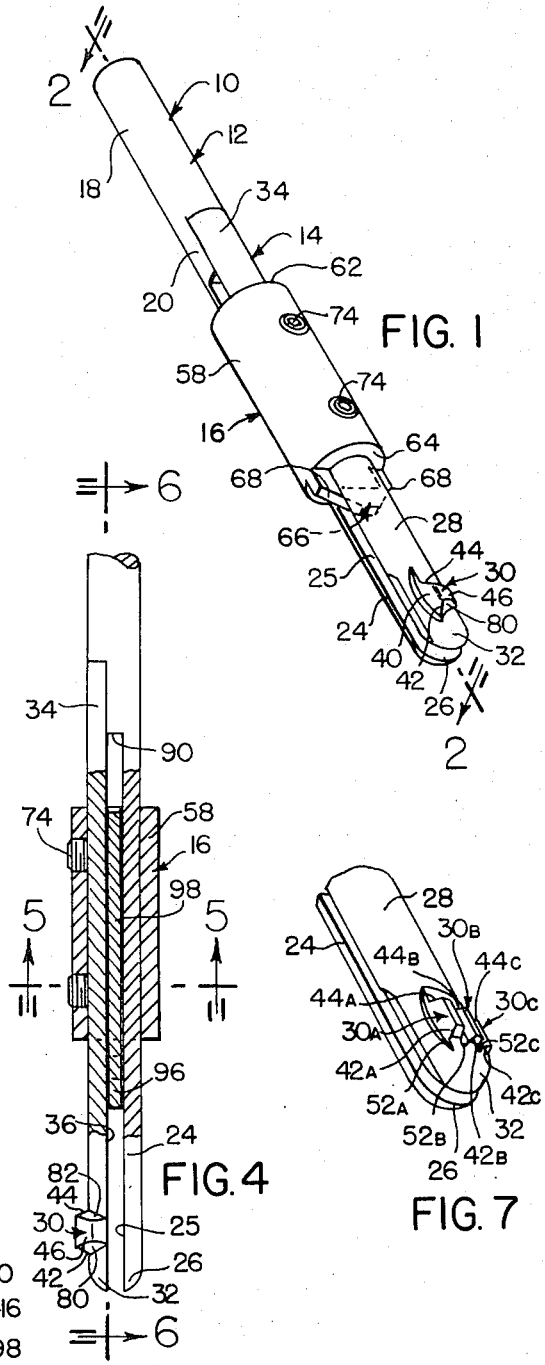
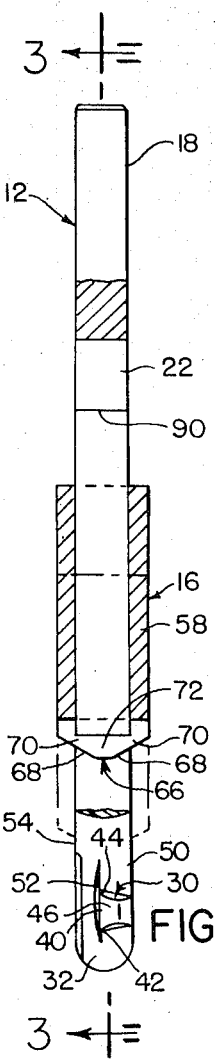
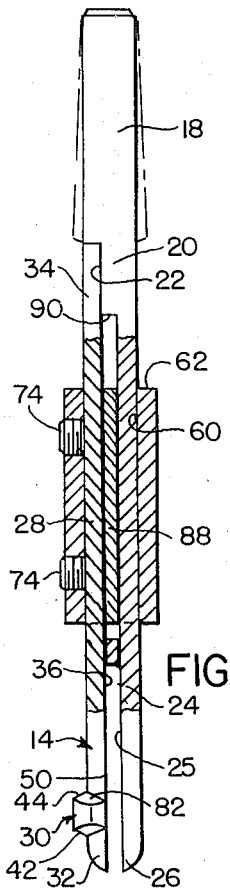
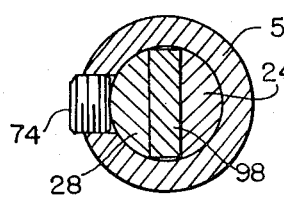
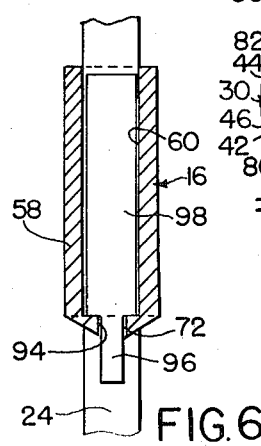
INVENTOR.
DOMINIC J. RUSIN
BY
ATTORNEY 3,720,477
DEBURRING TOOL
Dominic J. Rusin, 10041 Chatham Ave.,
Detroit, Mich. 48239
Filed July 12, 1971, Ser. No. 161,795
Int. Cl. B23b 51/16
U.S. Cl. 408—226         24 Claims

ABSTRACT OF THE DISCLOSURE

A deburring tool device having an adjustable tension control member embodying chamfer cutting edges and a removable readily-replaceable deburring tool insert, is disclosed. The tension on the tool insert is controlled by the position of the control member upon the tool arbor and the insert. The deburring cutter insert can be provided with a plurality of cutting edges for the face and backside of holes requiring such treatment, to materially increase the tool life of the insert.

---

The invention involves a deburring tool having a removable replaceable deburring cutter insert, a supporting arbor for the insert and a tension control member securing the tool insert to the arbor. The control member is adjustably slidable upon the arbor and insert to impart greater or lesser tension to the pilot and cutting ends of the insert and arbor, for passage into and through a hole in a metal member requiring deburring on both sides of the hole. The control member is also provided with forward distal chamfer cutting edges to chamfer the face side of the metal member which has been deburred by the pilot end of the tool.

Where the deburring tool is designed for service in holes of relatively large diameter, as for instance ⅜ inch and greater, the control member disclosed will normally not require a supporting insert therein between the tool insert and the arbor in order to securely hold the tool insert parallel with the arbor tongue. However, when the hole diameter to be deburred is about 5/16 inch diameter or less, the tool insert and arbor members are so relatively thin and flexible that, if the control member is not provided with a spacing insert, between these parts, securement of the tool insert to the arbor will usually cause it to flex at the pilot end, increasing the spacing between these parts so that the pilot end of the tool will not readily enter the small diameter hole. Therefore, in order to maintain the tool insert substantially parallel with the arbor tongue, the control member insert is interposed between these elements within the control member. Securement of the tool insert by the set screws of the control member with the insert therebetween maintains the tool insert in parallel wth the arbor tongue. The control member insert, as hereinafter disclosed, can take at least two preferred forms.

Prior art deburring tool devices have long been known and are generally formed with a shank and forwardly projecting longitudinally split members adapted to chamfer the face side of a hole edge, and will compress together for travel into and through the hole, debur the underside edge of the hole and then be brought upwardly through the hole for removal therefrom. When the deburring cutting edge of such a tool, whether controlled as to tension at the pilot end or not, becomes dull and worn, the tool is no longer usable and must be discarded. One advantage of the instant invention is that only a portion of the entire deburring tool, when the cutting edges are worn, need be discarded and replaced by a new tool insert, the supporting arbor and tension control member being retained. The cost of a replaceable tool insert is substantially less than that of a complete tool, and by providing a plurality of deburring cutting edges in the tool insert and an improved tensioning control member, the invention in fact provides significant economic advantages and functional improvements over heretofore known deburring tools.

It is an object of the invention to provide an improved deburring tool which embodies a replaceable cutting tool insert, a supporting arbor and a tensioning control member which functions to adjustably tension the pilot end of the combination tool and, optionally, to chamfer the face side of a hole edge. Another object is to provide such a deburring tool having an insert within the tension control member for maintaining a parallel relationship between the removable tool insert and the arbor tongue. A further object is to provide a tool insert having a plurality of cutting edges whereby the utility and life of the tool insert are appreciably increased. Still another object is to provide a deburring tool having substantial economic advantages over currently conventional similar tools while significantly increasing the functional advantages over such tools.

Various further and more specific objects, features and advantages of the invention will appear from the description given below, taken in connection with the accompanying drawings, illustrating by way of example a preferred form of the invention. Reference is here made to the drawings annexed hereto and forming an integral part of this specification, in which FIG. 1 is a perspective view of a deburring tool embodying the invention.

FIG. 2 is a longitudinal sectional view, partially in plan, taken substantially on the line 2—2 of FIG. 1.

FIG. 3 is a longitudinal sectional view, partially in elevation, taken substantially on the line 3—3 of FIG. 2.

FIG. 4 is a longitudinal sectional view, similar to that illustrated in FIG. 3, showing a slightly modified form of the control member and its insert.

FIGS. 5 and 6 are transverse and fragmentary longitudinal sectional views, taken substantially on the lines 5—5 and 6—6 of FIG. 4.

FIG. 7 is a fragmentary perspective view of the deburring tool insert showing a modified form of the deburring cutting edge.

As illustrated in the drawing and particularly in FIG. 1, the deburring tool 10 comprises the arbor 12, the tool insert 14 and the tension control member 16.

The arbor 12 has a shank portion 18 adapted to be secured in the rotatable chuck of a power driven machine tool (not shown), an intermediate pad portion 20 having a flat seat 22 thereon to receive the seat one end of the deburring tool insert 14, and a forwardly projecting tongue 24, of circular segment cross-section, having a flat surface 25 and terminating in the distal pilot nose end 26. The arbor 12 is made of tool steel, hardened and ground.

Although the shank portion 18 of the arbor 12 is illustrated as being cylindrical in configuration, it will be understood by persons skilled in the art that a tapered shank may also be utilized for the arbor, shown in broken lines in FIG. 3.

The deburring tool insert 14, also made of hardened and ground tool steel, comprises the body 28 having the projecting cutting bit portion 30 adjacent but spaced slightly rearwardly of the distal nose end 32, and the shank 34 at its proximal end adapted to rest and seat upon the flat seat 22 of the arbor pad 20. The outer surface of the tool insert 14 is convexly curved except for the tool bit portion 30 which projects laterally from the body surface. The underside of the tool insert comprises the flat surface 36 that is arranged to lie parallel to the flat surface 25 of the arbor tongue 24 when the tension control member 14 secures them in operative relationship. The two flat surfaces 25 and 36 are spaced apart from each other a distance substantially equal to the height of the intermediate arbor portion 20. The arbor 12 is cylindrical in the shank portion 18 and has a circular segment cross-section through the pad portion 20 and the tongue 24. Similarly, the tool insert shank 34, body 28 and its distal nose portion 32 are segments of a circular cross-section.

The deburring cutting tool bit portion 30 of the tool insert 14 comprises the elevated body cutting face 40 having the lateral forward deburring cutting edge 42 and a lateral rearward deburring cutting edge 44, each blending with a radius at the top of their edges into the crown 46 of the tool bit portion 30, which slopes and curves downwardly toward the lateral edge 50 of the tool insert. Forwardly of the cutting face 40, the tool insert body 28 is cut away to provide a flute or chip recess 52 adjacent the opposite lateral edge 54 of the body. Side relief from the cutting edges 42 and 44 is provided by the rearwardly tapering sides 80 and 82 respectively.

The tension control member 16, made of hardened and ground tool steel, comprises the body portion 58 having a bore 60 extending from its proximal end 62 to its forward face 64 substantially the diameter of the arbor shank portion 18, a distal projecting chamfer web 66 integrally connected to each side of the body 58 and having chamfer cutting edges 68, 68 machined on the lateral tapering portions 70, 70 connected by the intermediate web portion 72. A pair of set screws 74, 74 are threadedly mounted in the body 58 and in a plane substantially normal to the plane of the chamfer web 66.

The tool insert body 28 and shank portion 34 are disposed to one side of the plane of the chamfer web 66 in the bore 60 of the control member 16, the shank 34 being seated upon the flat surface 22 of the intermediate arbor pad portion 20, under the socket set screws 74, 74. The chamfer web 66 rests upon the flat surface 25 of the arbor tongue 24, and thus becomes a spacer between the tool insert body 28 and the arbor tongue 24. As the control member 16 is adjusted and secured forwardly toward the distal nose ends 26 and 32, the relative flexibility of the tool insert and arbor tongue ends is materially reduced, i.e., the "tension" between these end portions is increased. When such tension is established, the effective cutting action of the deburring edges 42 and 44 is also significantly increased. At the same time the pressure required to drive the pilot ends of the tool 10 and the cutting bit portion 30 into and through the hole being deburred is also increased. As the control member 16 is adjusted rearwardly toward the arbor shank portion 18, the flexibility of the tool insert 14 and the arbor tongue 24 at their distal ends is increased. Effective deburring of the hole edges, although maintained, proceeds with less pressure upon such edges, by virtue of the reduced "tension."

FIGS. 3–6 illustrate slight modifications in the deburring tool 10. These modifications apply more particularly to the tension control member 16 and are directed to maintaining the tool insert body 28 substantially in parallel with the arbor tongue 24 when the control member is advanced toward the pilot end of the deburring tool and the body 58 extends forwardly of the seat pad portion 20. Under such conditions, undue upward flexure of the tool insert distal pilot nose end 32 will normally occur when the set screws 74, 74 bear upon the tool insert body 28, and particularly for small diameter tool inserts of the order of from about 5/16 inch and less, due to the bending moment about one or the other of the set screws 74, the tool insert body pivoting upon the forward web portion 66. In order to maintain the desired parallel relationship of the tool insert 14 with the arbor tongue 24, an insert block 88 is disposed within the bore 60 of the control member body 58 rearwardly of the chamfering web portion 66, under the set screws 74, 74, and forward of the distal face 90 of the arbor seat portion 20, particularly as illustrated in FIG. 3. When the control member body 58 is advanced and adjusted forwardly so that it extends beyond the end face 90 of the seat, the spacer insert 88 supports the tool insert body 28 against the bending moment urged by seating the set screws 74, 74 thereupon. The spacer block or insert 88 is substantially rectilinear in form and substantially the height of the distal face 90 in thickness.

In the modified form illustrated in FIGS. 4–6, the tension control member 16 has its intermediate web portion 72 slotted medially and axially at 94, to provide a passage therethrough for the tongue 96 of the insert block 98 disposed within the bore 60 of the control member body 58. The forward extension of the insert tongue 96, beyond the distal edge of the web portion 72, permits an increase in tension at the distal ends of the tool insert 14 and the arbor tongue 24 without advancing the control member body 58.

The deburring tool bit modification illustrated in FIG. 7 comprises a plurality of substantially aligned parallel deburring cutting tool bit portions 30. Each of the deburring tool bits 30a, 30b and 30c are spaced apart from each other, each having a chip pocket, flute or recess 52a, 52b and 52c respectively with lateral deburring edges 42a and 44a, 42b and 44b, and 42c and 44c, respectively, to provide a substantially increased tool life by virtue of the plurality of deburring cutting edges. Each of the deburring cutting tool bit portions 30a, 30b and 30c are progressively narrower and shorter as they taper rearwardly and downwardly, substantially according to the configuration of the single tool bit portion 30. Thus, when the forward tool bit portion 30a becomes dull and worn at its cutting edges 42a and 44a, the entire bit portion can be ground away to the plane of the surface of the tool insert body 28 exposing the cutting edges 42b and 44b for use in deburring. When the second tool bit portion 32b is worn and dull, it can be removed by grinding to expose the third cutting edges 42c and 44c for the deburring operation.

In operation, the deburring tool 10 is arranged with the tool insert shank portion 34 seated upon the arbor seat surface 22 and secured thereto by the set screws 74, 74 in the body 58 of the tension control member 16. The position of the control member is adjusted forwardly or rearwardly according to the "tension" desired between the distal pilot portions 32 and 26 of the tool insert and arbor tongue respectively. The set screws 74 are then secured firmly upon the tool insert body 28 and/or its shank portion 34. For small diameter deburring tools, the rectilinear insert block 88 or tongue insert block 98 is disposed within the bore 60 of the control member 16 to provide the desired parallel relationship between the tool insert body 28 and the arbor tongue 24.

The deburring tool 10 is then ready for use in a pre-drilled or pre-cut hole in a metal part (not shown) by securing the tool shank 18 in a machine tool chuck, and while rotating the tool 10, deburring the edge of the hole on its facing side. When such deburring has been completed, the tool 10 is advanced through the hole by compressing the pilot ends of the tool insert body and the arbor tongue 24 and squeezing them toward each other. When the cutting bit portion 30 passes entirely through the hole, the tool 10 is retracted upwardly so that the cutting edge 44 bears against the underside edge of the hole to remove burrs therefrom. The tool 10 is then drawn further upwardly, again compressing the distal ends of the tool insert and arbor tongue toward each other at the bit portion 30, and the entire tool 10 is then removed from the deburred hole. The manner in which a deburring tool is used is illustrated and described in Cogsdill Pat. No. 3,217,750.

The speeds for rotating the deburring tool 10 when applied to steel, brass, copper, aluminum, and other metals are well known in the art to which the invention pertains.

To chamfer the deburred hole on its facing side, the tool 10 is advanced through the hole until the chamfering cutting edges 68, 68 bear upon the facing edge of the hole, cutting a chamfer of the desired diameter and depth therein. The tool is then retracted and withdrawn from the hole as in a deburring operation.

Although particular preferred forms or embodiments of the invention have been disclosed herein for purposes of explanation, further modifications or variations thereof, after study of this specification, will or may become apparent to those skilled in the art to which the invention pertains. Reference should be had to the appended claims in determining the scope of the invention.

I claim:

1. A deburring tool comprising in combination,
    a removable replaceable flexible resilient deburring cutting tool insert,
    an arbor having
        a shank,
        a flexible resilient tongue portion extending longitudinally from said shank,
        and a tool insert seat portion at the proximal end of said tongue portion adjacent said shank,
    and a tension control member for said tool insert and tongue portion adjustably movable upon said arbor longitudinally of, about and between said tongue portion and said tool insert, and securing said tool insert upon said arbor in spaced apart parallel relationship to said tongue portion,
said tension control member having
    a body portion encircling said tool insert and arbor tongue portion,
    and a substantially planar web portion secured to the distal end of said body portion substantially medially and axially thereof and projecting forwardly therefrom between said tool insert and said arbor tongue portion.

2. The deburring tool defined in claim 1 wherein said tool insert has a longitudinally extending elongated body provided with a laterally projecting deburring cutting tool bit portion adjacent but spaced rearwardly of its distal end,
    said tool bit portion having lateral deburring upper and lower cutting edges and a chip flute forwardly thereof.

3. The deburring tool defined in claim 2 wherein said tool insert body is of circular segmental cross-section.

4. The deburring tool defined in claim 2 wherein said cutting tool bit portion is formed integrally with said tool insert body.

5. The deburring tool defined in claim 2 wherein said tool insert elongated body and said arbor tongue portion have relative flexibility and resiliency forwardly of said control member, depending upon the position of said control member relative to the distal ends of said tool insert and arbor tongue portion.

6. The deburring tool defined in claim 2 wherein said tool bit portion is provided with top and side relief for each of said upper and lower cutting edges.

7. The deburring tool defined in claim 1 wherein said tool insert is provided with a plurality of laterally projecting deburring cutting tool bit portions arranged substantially in parallel spaced apart relationship.

8. The deburring tool defined in claim 7 wherein said tool bit portions are of gradually sequentially reduced height and width from the first of said portions to the rearmost thereof.

9. The deburring tool defined in claim 1 wherein said arbor shank is cylindrical.

10. The deburring tool defined in claim 1 wherein said arbor shank is rearwardly tapering.

11. The deburring tool defined in claim 1 wherein said tool insert seat portion is planar.

12. The deburring tool defined in claim 1 wherein said tool insert seat portion is disposed forward and adjacent said shank.

13. The deburring tool defined in claim 1 wherein said arbor tongue portion terminates at its distal end substantially in register with the distal end of said tool insert when the latter is secured fully upon said arbor seat portion by said tension control member.

14. The deburring tool defined in claim 1 wherein said arbor tongue portion is provided with an elongated body of circular segmental cross-section.

15. The deburring tool defined in claim 1 wherein said tension control member is adjustably movable axially of and upon said tool insert and arbor.

16. The deburring tool defined in claim 1 wherein said tension control member body portion is tubular cylindrical in cross-section.

17. The deburring tool defined in claim 1 wherein said control member body overlies portions of said tool insert body and said arbor tongue portion disposed therein and spaced apart by said web portion.

18. The deburring tool defined in claim 1 wherein said web portion is provided with countersink tapering cutting edges substantially in the lateral forward regions thereof.

19. The deburring tool defined in claim 1 wherein said tension control member is provided with fastener means to secure said tool insert body to said arbor seat portion and said web portion.

20. The deburring tool defined in claim 1 wherein said tool insert body is secured against one side of said planar web portion and said arbor tongue portion is secured against the other side of said web portion.

21. The deburring tool defined in claim 1 wherein said control member is adjustably movable axially of said tool insert and arbor for adjustably controlling the relative tensioning and flexibility of the distal ends of said tool insert and arbor tongue portion.

22. The deburring tool defined in claim 1 and including
    a spacing insert within said control member and intermediate said tool insert body and said arbor tongue portion.

23. The deburring tool defined in claim 22 wherein the thickness of said spacing insert is substantially the thickness of said web portion.

24. The deburring tool defined in claim 22 wherein said spacing insert is provided with a distal projecting tongue,
    said web portion being notched axially to pass said insert projecting tongue therebetween and forwardly thereof.

References Cited
UNITED STATES PATENTS

| | | | |
|---|---|---|---|
| 3,306,136 | 2/1967 | Gustkey | 408—226 |
| 3,420,125 | 1/1969 | Gogsdill | 408—226 |
| 3,449,984 | 6/1969 | Cogsdill | 408—226 X |

FRANCIS S. HUSAR, Primary Examiner

U.S. Cl. X.R.

408—714